(12) United States Patent
Korhonen et al.

(10) Patent No.: US 11,503,592 B2
(45) Date of Patent: Nov. 15, 2022

(54) TIMING CONTROL FOR INTEGRATED ACCESS AND BACKHAUL (IAB)

(71) Applicant: Nokia Solutions and Networks Oy, Espoo (FI)

(72) Inventors: Juha S. Korhonen, Espoo (FI); Keeth Saliya Jayasinghe Laddu, Espoo (FI); Ilkka Keskitalo, Oulu (FI); Esa Tiirola, Kempele (FI)

(73) Assignee: Nokia Solutions and Networks Oy, Espoo (FI)

( * ) Notice: Subject to any disclaimer, the term of this patent is extended or adjusted under 35 U.S.C. 154(b) by 106 days.

(21) Appl. No.: 17/172,647

(22) Filed: Feb. 10, 2021

(65) Prior Publication Data

US 2021/0289495 A1 Sep. 16, 2021

Related U.S. Application Data

(60) Provisional application No. 62/989,970, filed on Mar. 16, 2020.

(51) Int. Cl.
*H04W 72/04* (2009.01)
(52) U.S. Cl.
CPC .............. *H04W 72/0446* (2013.01)
(58) Field of Classification Search
CPC .................................................. H04W 72/0446
See application file for complete search history.

(56) References Cited

U.S. PATENT DOCUMENTS

| | | | |
|---|---|---|---|
| 2022/0039038 A1* | 2/2022 | Liu | H04W 56/0005 |
| 2022/0174622 A1* | 6/2022 | Park | H04W 56/001 |
| 2022/0217772 A1* | 7/2022 | Harada | H04W 72/0426 |

OTHER PUBLICATIONS

"3rd Generation Partnership Project; Technical Specification Group Radio Access Network; NR; Physical layer procedures for control(Release 15)", 3GPP TS 38.213, V15.7.0, Sep. 2019, pp. 1-108.
"3rd Generation Partnership Project; Technical Specification Group Radio Access Network; NR;Medium Access Control (MAC) protocol specification(Release 15)", 3GPP TS 38.321, V15.8.0, Dec. 2019, pp. 1-78.
"3rd Generation Partnership Project; Technical Specification Group Radio Access Network; NR; Study on Integrated Access and Backhaul; (Release 16)", 3GPP TR 38.874, V16.0.0, Dec. 2018, pp. 1-111.

(Continued)

*Primary Examiner* — Melvin C Marcelo
(74) *Attorney, Agent, or Firm* — Nokia Technologies Oy

(57) ABSTRACT

Systems, methods, apparatuses, and computer program products for the synchronization and timing of IAB nodes are provided. One method may include determining, at a parent node, a resource configuration and using the determined resource configuration to set a timing advance (TA) mode with two offsets comprising a first offset to be used with time division multiplexing (TDM) and a second offset to be used with at least one of spatial division multiplexing (SDM) or frequency division multiplexing (FDM). The method may also include transmitting a command, to an integrated access and backhaul (IAB) node, to start adjusting mobile termination (MT) uplink (UL) transmission (Tx) timing based on the resource configuration and the timing advance (TA).

20 Claims, 5 Drawing Sheets

(56) References Cited

OTHER PUBLICATIONS

"New WID: Integrated Access and Backhaul for NR", 3GPP TSG RAN Meeting #82, RP-182882, Agenda : 9.1.2, Qualcomm, Dec. 10-13, 2018, 7 pages.

"New WID on Enhancements to Integrated Access and Backhaul", 3GPP TSG RAN Meeting #86, RP-193251, Agenda : 9.1.2, Qualcomm, Dec. 9-12, 2019, 5 pages.

"Final Report of 3GPP TSG RAN WG1 #93 v1.0.0", 3GPP TSG RAN WG1 Meeting #94, R1-1808001, MCC Support, Aug. 20-24, 2018, 198 pages.

* cited by examiner

IAB Node Transmitting

IAB Node Receiving

TIMING CONTROL FOR INTEGRATED ACCESS AND BACKHAUL (IAB)

RELATED APPLICATIONS

The present application claims priority from provisional application No. 62/989,970, filed on Mar. 16, 2020

FIELD:

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to integrated access and backhaul (IAB), such as systems and/or methods for the synchronization and timing of IAB nodes.

BACKGROUND:

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE- Advanced (LTE-A), MulteFire, LTE-A Pro, and/or fifth generation (5G) radio access technology or new radio (NR) access technology. 5G wireless systems refer to the next generation (NG) of radio systems and network architecture. A 5G system is mostly built on a 5G new radio (NR), but a 5G (or NG) network can also build on the E-UTRA radio. It is estimated that NR provides bitrates on the order of 10-20 Gbit/s or higher and can support at least service categories such as enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. The next generation radio access network (NG-RAN) represents the RAN for 5G, which can provide both NR and LTE (and LTE-Advanced) radio accesses. It is noted that, in 5G, the nodes that can provide radio access functionality to a user equipment (i.e., similar to the Node B, NB, in UTRAN or the evolved NB, eNB, in LTE) may be named next-generation NB (gNB) when built on NR radio and may be named next-generation eNB (NG-eNB) when built on E-UTRA radio.

BRIEF DESCRIPTION OF THE DRAWINGS:

For proper understanding of example embodiments, reference should be made to the accompanying drawings, wherein.

Figure 1:
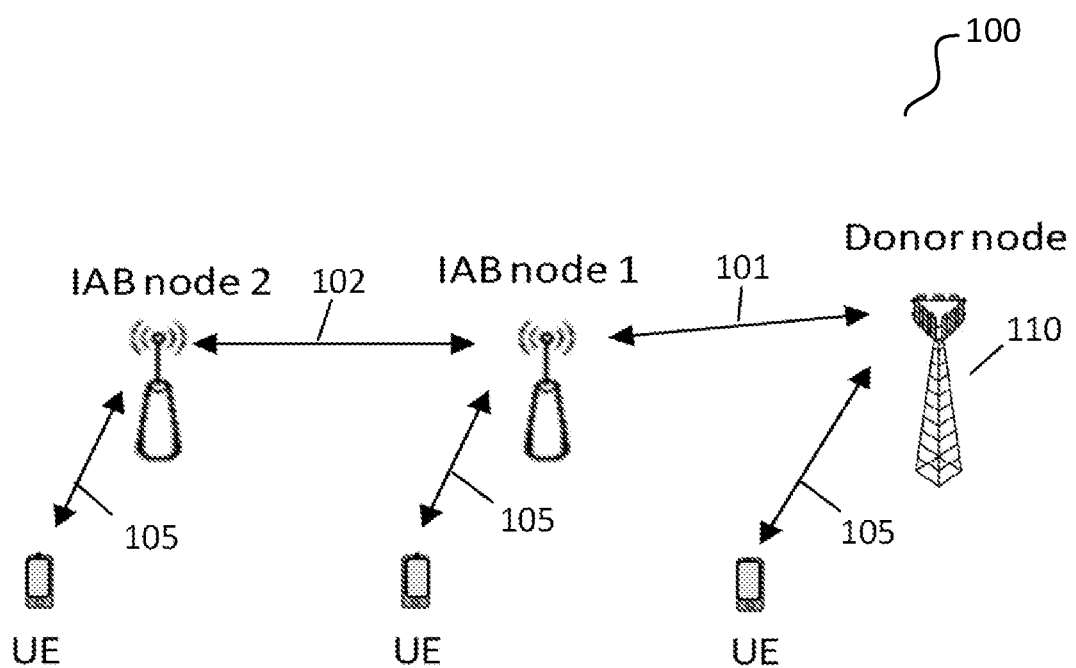
FIG. 1 illustrates an example IAB network, according to an embodiment.

DETAILED DESCRIPTION:

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for the synchronization and timing of IAB nodes, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as illustrative of the principles and teachings of certain example embodiments, and not in limitation thereof.

As introduced above, certain embodiments described herein may relate to IAB and, for example, to the synchronization and timing in for an IAB node. A focus of 3GPP Release-16 IAB was on the time division multiplexing (TDM) between IAB mobile termination (MT) and IAB distributed unit (DU) or, in other words, TDM between access (child) link and (parent) backhaul link. Thus, in Release-16, the behaviour of the IAB node is just defined for TDM cases. However, IAB is not restricted to this scenario and, for example, spatial division multiplexing (SDM), frequency division multiplexing (FDM) or full duplex (FD) based IAB operation may be used. To enable such scenarios, it has been agreed that the indication of the multiplexing capability for the case of no-TDM between IAB MT and IAB DU may additionally be provided with respect to each transmission-direction combination (per MT CC/DU cell pair), such as MT-TX/DU-TX, MT-TX/DU-RX, MT-RX/DU-TX, MT-RX/DU-RX.

In 3GPP Release-17 IAB, an objective for duplexing enhancements is to increase spectral efficiency and reduce latency through the support of SDM/FDM-based resource management, for example, through simultaneous transmissions and/or reception on IAB-node MT and DU. A related objective is the support of simultaneous operation (transmission and/or reception) of IAB-node's child and parent links (i.e., MT Tx/DU Tx, MT Tx/DU Rx, MT Rx/DU Tx, MT Rx/DU Rx).

In IAB deployments, the traffic from IAB nodes is wirelessly backhauled between IAB node and IAB donor, or another IAB node, using an established backhaul (BH) network topology. FIG. 1 illustrates an example system 100 depicting a two-hop IAB network, according to certain embodiments. More specifically, from the UEs' point of view, FIG. 1 illustrates an example in which there are three hops represented by links 101, 102, 105, but two of these links 101, 102 are BH and the last hop 105 is an access link. It should be noted that example embodiments are not limited to a two-hop scenario, as any number of hops may be included according to certain embodiments. Therefore, FIG. 1 is just one possible example for purposes of illustration.

As illustrated in the example of FIG. 1, an IAB node may have BH links towards parent and child IAB nodes, and it may also serve UEs with access links 105. In the example of FIG. 1, the parent node 110 of IAB node 1 may be a donor node that has a wired BH connection 101 and IAB node 1 provides backhaul connection 102 for its child IAB node 2. In addition, all the nodes may directly serve UEs.

In the example system of FIG. 1, the IAB node 1 may have the following links to support: downlink (DL) and uplink (UL) for access UEs, receiving DL parent BH from the donor, transmitting UL parent BH to the donor, transmitting DL child BH to the child IAB node 2 and receiving UL child BH from the child IAB node 2.

It is specified that IAB should support TDM, FDM, and SDM between access and BH links at an IAB node, subject to a half-duplex constraint. It is noted that half-duplex constraint means that an IAB node is not capable of receiving and transmitting at the same time. Certain embodiments described herein may address the FDM/SDM scenarios since the TDM scenario can be done applying similar timing control as with UEs (e.g., see case 1 below).

Figure 2A:
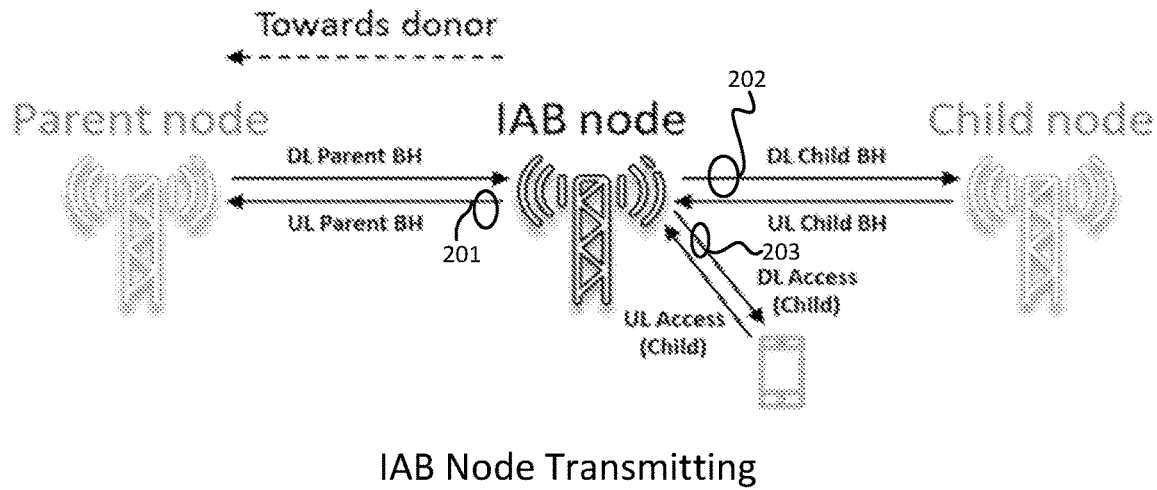
FIG. 2a illustrates an example of an IAB FDM/SDM scenario.
Figure 2B:
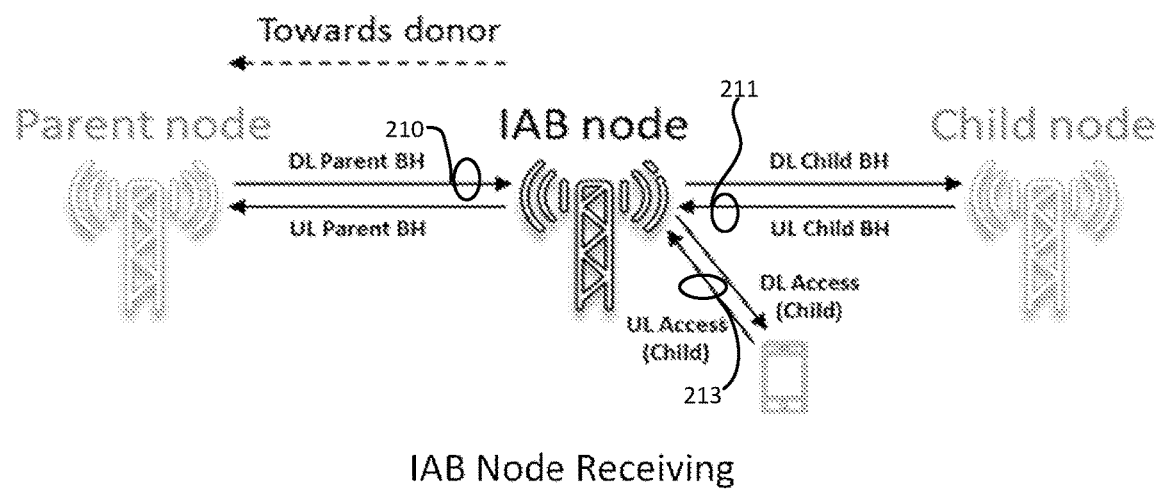
FIG. 2b illustrates another example of an IAB FDM/SDM scenario.

FIGS. 2a and 2b illustrate an example of IAB FDM/SDM scenarios, according to an embodiment. In the case of FDM/SDM half-duplex, an IAB node is either transmitting or receiving access and backhaul at the same time as depicted in the example of FIG. 2. More specifically, FIG. 2a illustrates an example in which an IAB node is transmitting access and backhaul via UL Parent BH link 201, DL Child BH link 202, and DL Access link 203. FIG. 2b illustrates an example in which an IAB node is receiving access and backhaul via DL Parent BH link 210, UL Child BH link 211, and UL Access link 213. In addition to these modes, an IAB node capable of FDM/SDM half-duplex, can operate also according to TDM rules, at least for certain resources and/or certain channels. It should be noted that a FDM/SDM scenario can be implemented with one or multiple antenna panels at the IAB node. In the single panel scenario, an IAB node processes parent BH and child links using the same baseband (this may happen also in the multi-panel scenario). At least the following issues may be considered in this scenario: parent BH and child link(s) share common power amplifier(s) (PAs) resulting in potentially reduced DL coverage for the child links (compared to a multi-panel scenario), Tx and Rx timing alignment between parent BH and child link(s) may be required at the IAB node, and IAB reception suffers from power imbalance between parent BH and child links and inter-symbol interference needs to be mitigated.

With respect to IAB node synchronization and timing alignment (TA), seven different TX and RX timing configurations for the different links have been considered, but three configurations remain for further consideration (these are termed case #1, case #6, and case #7 discussed below).

Case #1 is the DL transmission timings aligned across IAB-nodes and IAB-donors and the UL timing based on legacy timing advance control, i.e., applying the same principle as the access UE. In this case, if DL TX and UL RX are not exactly aligned at the parent node, besides timing advance commands, additional information about the offset is needed for the child node to properly set its DL TX timing for over the air (OTA) based timing & synchronization. Case#1 UL timing is based on legacy timing advance (TA) control, i.e., applying the same principle as the access UE.

Case #6 is the DL transmission timings aligned across IAB-nodes and IAB-donors and the MT and DU TX timings aligned within a node. In this case, the DL transmission timing for all IAB nodes is aligned with the parent IAB node or donor DL timing, and the UL transmission timing of an IAB node can be aligned with the IAB node's DL transmission timing. MT and DU Tx timings alignment means that (OFDM) symbol timing and/or slot timing between MT and DU is aligned.

Case #7 is the DL transmission timings aligned across IAB-nodes and IAB-donors and the MT and DU RX timings aligned within a node. In this case, the DL transmission timing for all IAB nodes is aligned with the parent IAB node or donor DL timing, and the UL reception timing of an IAB node can be aligned with the IAB node's DL reception timing. Further, if DL TX and UL RX are not well aligned at the parent node, additional information about the alignment may be needed for the child node to properly set its DL TX timing for OTA based timing & synchronization.

The three remaining configurations discussed above (i.e., case #1, case #6, and case #7) include synchronized DL transmissions between the nodes so that the network appears synchronized for the UEs. In two of the configurations (case #1 and #7) BH UL TX timing is controlled by timing advance commands in a similar way as UL TX timing of UEs. The difference between case #1 and #7 is that in case #7 the BH UL RX timing is aligned with the BH DL RX timing, while in case #1 the BH UL RX timing may be in a fixed relation to the DL TX timing. The third timing configuration (case #6) intends to align the TX timings of an IAB node. This means that the conventional TA control is not in use, as BH UL TX timing is tied to BH DL TX timing. It is noted that case #6 and #7 are intended for supporting FDM/SDM of TX or RX signals.

One problem considered by some embodiments discussed herein may include how to control the duplexing scheme. As outlined above, Release-16 supports the indication of no-TDM between IAB MT and IAB DU by additionally providing details on SDM/FDM combinations, i.e., MT-TX/DU-TX, MT-RX/DU-RX. As additionally discussed above, timing scenarios of case #6 and case #7 are to be used at the IAB node when supporting SDM/FDM duplexing. However, using these duplexing modes and timing cases without parent node control could cause concerns at the parent node reception.

Another problem addressed herein may include how to facilitate smooth coexistence between different timing approaches. It is understood that switching between different duplexing modes is allowed at the IAB node. Also, in case #6, one solution is for an IAB node to carry out parallel (always time multiplexed) case #1 and case #6 uplink transmissions to enable DL transmission alignment between IAB nodes.

According to example embodiments discussed herein, indication available (IA) means that the DU resource is explicitly or implicitly indicated as available, and indication not available (INA) means that the DU resource is explicitly or implicitly indicated as not available. From an IAB-node MT point-of-view, as in Release-15, the following time-domain resources can be indicated for the parent link: downlink time resource, uplink time resource, and/or flexible time resource. From an IAB-node DU point-of-view, the child link may have the following types of time resources: downlink time resource, uplink time resource, flexible time resource, and/or not available time resources (resources not to be used for communication on the DU child links). In some examples, each of the downlink, uplink and flexible time-resource types of the DU child link can belong to one of two categories: hard or soft. Hard refers to the corresponding time resource is always available for the DU child link, and soft refers to the availability of the corresponding time resource for the DU child link is explicitly and/or implicitly controlled by the parent node.

As mentioned above, certain embodiments may relate to timing control for MT UL transmission of IAB node. It may be assumed that IAB DL timing is aligned between parent and child nodes.

An embodiment provides that MT UL transmission timing is arranged by means of two offset values: offset 1 to be used with TDM and offset 2 to be used with SDM/FDM (within panel). In certain embodiments, offset 1 can be based on legacy TA control according to case #1 timing alignment and offset 2 aligns MT TX with DU TX according to case #6.

Figure 3:
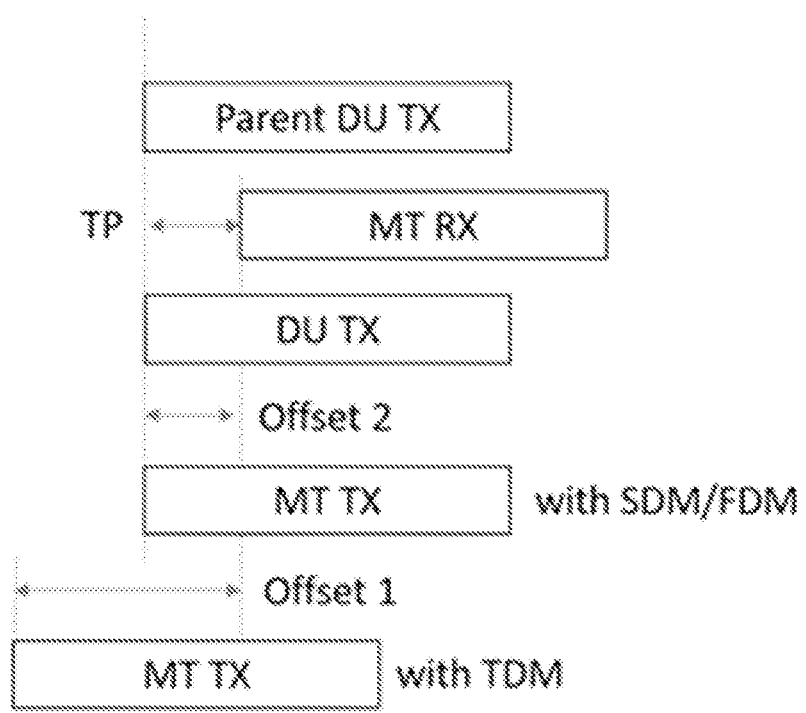
FIG. 3 illustrates an example diagram of IAB MT Transmission (Tx) timing in FDM/SDM and TDM scenarios, according to some embodiments.

FIG. 3 illustrates an example diagram of IAB MT TX timing in FDM/SDM and TDM scenarios, according to some embodiments. As illustrated in the example of FIG. 3, offset 1 and 2 may be measured from the MT RX timing.

In one embodiment, offset 2 is equal to the signal propagation delay (TP) on the parent link. This is because with case #6 timing, MT TX timing is equal to DU TX timing, and DU TX timing is aligned with parent DU TX timing. This means that the receiving timing of the signal transmitted with offset 2 is not under the control of the parent node but the receiving timing is TP after the parent DU Tx timing. On the other hand, offset 1 is controlled by the parent node to allow it to receive BH link(s) and access link signals with a single receiving timing. The parent node may adjust the offset 1 not only based on TP, but also based on other aspects such as gNB implementation issues. The single receiving timing may be chosen to be close to but somewhat earlier than the parent DU TX timing, which means that offset 1 is approximately 2TP. Therefore, the time difference between offset 1 and offset 2 may depend on the propagation delay (TP) on the parent link and can start from 0 spanning one of more symbol durations. In the case when multiple IAB nodes are involved, MT signals transmitted with offsets 2 may arrive to the parent node with different timings as TPs to the IAB nodes may be different. Such UL signals may need to be time division multiplexed with respect to each other.

Certain embodiments may be configured to adjust MT UL transmission timing implicitly based on IAB resource configuration. For example, combination [MT Tx, DU not available (NA)] or [MT Tx, indication not available (INA)] indicates timing according to TDM (offset 1), and [MT Tx, DU indication available (IA)] indicates timing according to FDM/SDM (offset 2). In other words, in one embodiment, implicitly adjusting the MT UL transmission timing may refer to the situation where there is no explicit signaling defined for the MT UL transmission timing adaptation; rather, MT may derive the MT UL transmission timing based on IAB (MT, DU) resource configuration.

According to some embodiments, MT Tx may be determined based on valid UL scheduling grant (such as DCI format 0_0, 0_1). It is noted that valid UL scheduling grant may refer to the scenario where MT is allowed to transmit according to the scheduling or configuration. For example, if UL grant relates to MT DL resource, then it may not be valid UL grant. Another option to determine MT Tx, relevant for semi-persistent or periodic UL transmission, is based on other information such as MT resource configuration (U/D/F) and/or dynamic slot format indication (SFI) indicated using DCI format 2_0. In an embodiment, DU NA/IA/INA may be determined based on at least one of the following: higher layer configuration equals to NA, dynamic indication using DCI format 2_5, and/or implicit determination. According to some embodiments, MT Tx may be determined based on rules, such as rules defined for Rel-16 IAB operation—MT Tx may be determined in all scenarios when the IAB node, MT part, is allowed to transmit. These may cover also sounding reference signal (SRS) and PUCCH. In some examples, PRACH transmission may apply offset 1, offset 2 or a separate offset defined based on RACH procedure.

In certain embodiments, for multi-panel scenarios, [MT Tx, DU NA (or INA)] may indicate timing according to TDM (offset 1), and [MT Tx, DU IA] may indicate timing according to FDM/SDM. According to an embodiment, explicit indication in DL/UL grant may indicate which timing principle should be applied. For offset 1, simultaneous (MT Tx and) DU Tx can be supported (only) via different panel (i.e., FDM/SDM based in IAB implementation). For offset 2, simultaneous (MT Tx and) DU Tx can be supported (also) via the same panel. In these cases, explicit indication (such as one bit and/or one or two signaling states in UL/DL grant) may be used to override the implicit rule (based on resource configuration only).

Certain embodiments may include a process in which, initially, an IAB node operates according to TDM mode and MT operates according to offset 1 (i.e., based on legacy TA commands). The TP (propagation delay) can be estimated using the (legacy) TA and a signaled timing parameter (T_delta); TP may be used for synchronization and determining offset 2. The IAB node may indicate, towards the parent node, that SDM operation can be used with the timing alignment mode. As such, the parent node DU can be made aware of the capabilities of the (new) child IAB node. In an embodiment, the IAB node may receive a command, from parent node, to start adjusting MT UL transmission timing based on IAB resource configuration. When resource configuration indicates that SDM mode (with DU/MT timing alignment) is used, MT timing may follow offset 2. When resource configuration indicates not to use SDM mode with timing alignment, MT timing may follow offset 1. For multi-panel scenarios, explicit signaling in DL/UL grant may be used to select between offset 1 and offset 2 in the SDM mode. This may involve corresponding configuration, e.g., for UL grant (such as DCI format 0_0 and/or DCI format 0_1).

Figure 4A:
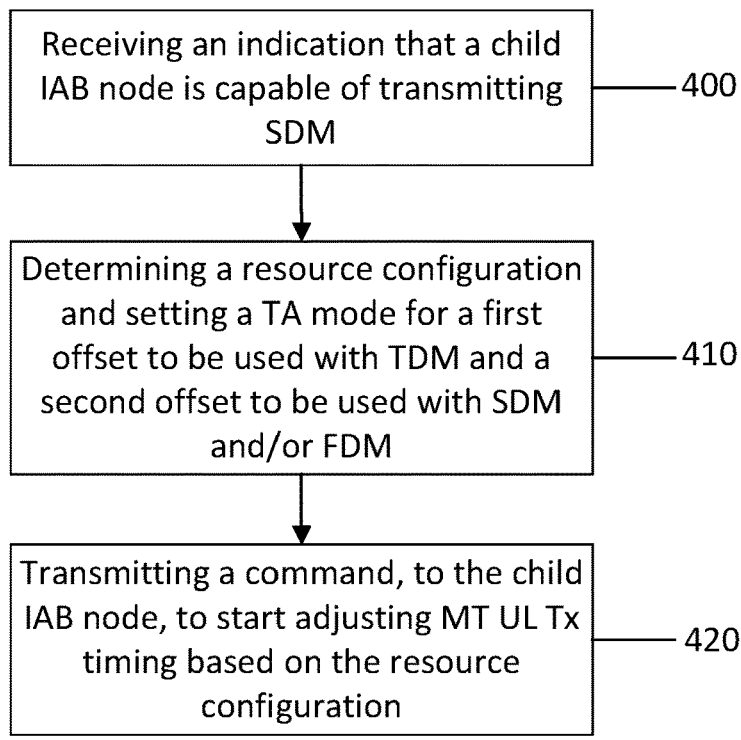
FIG. 4a illustrates an example flow diagram of a method, according to an embodiment.

FIG. 4a illustrates an example flow diagram of a method for performing synchronization and timing for an IAB node, according to one example embodiment. In an example embodiment, the flow diagram of FIG. 4a may be performed by a network entity or network node associated with a communication system, such as LTE or 5G NR. For instance, in some example embodiments, the network node performing the method of FIG. 4a may include a base station, eNB, gNB, NG-RAN node, and/or IAB node (DU part). In one example embodiment, the method of FIG. 4a may be performed by a parent IAB node, such as those illustrated in FIG. 1 or 2.

As illustrated in the example of FIG. 4a, the method may include, at 400, receiving an indication that a child IAB node is capable of transmitting SDM. In one example embodiment, the child IAB node may initially be operating according to TDM mode and MT may be operating according to legacy TA commands. In an embodiment, the method may include, at 410, allocating resources and/or determining a resource configuration and setting a TA mode with two offsets: a first offset (offset 1) to be used with TDM and a second offset (offset 2) to be used with SDM and/or FDM. In an embodiment, the first offset (offset 1) can be based on legacy TA control and the second offset (offset 2) may align MT Tx with DU Tx. According to one embodiment, the time difference between the first offset (offset 1) and the second offset (offset 2) may depend on the propagation delay (TP) on the link between the child IAB node and parent IAB node, and can start from 0 spanning one of more symbol durations. Thus, in certain embodiments, the length of the timing difference may depend on the propagation delay. According to an embodiment, when multiple IAB nodes are involved, scheduling of MT UL Tx with different UL reference timing may be time division duplexed with respect to each other.

As further illustrated in the example of FIG. 4a, the method may include, at 420, transmitting a command, to the child IAB node, to start adjusting MT UL Tx timing based on the resource configuration. When the resource configuration indicates that SDM and/or FDM mode with timing alignment is used, MT timing follows the second offset (offset 2). When the resource configuration indicates not to use SDM and/or FDM mode with timing alignment, MT timing follows the first offset (offset 1).

In one embodiment, the transmitting 420 may include providing the command to start adjusting the MT UL Tx timing based on the resource configuration. For example, according to an embodiment, where [MT Tx, DU NA] or [MT Tx, DU INA] indicates timing according to TDM, then the first offset may be applied (offset 1) and, where [MT Tx, DU IA] indicates timing according to FDM/SDM, then the second offset (offset 2) may be applied. In an embodiment, an IAB node may determine the DU status (NA, INA, IA), e.g., based on higher layer configuration (such as DU resource configuration) and/or based on dynamic signaling received from parent node (such as DCI format 2_5). Dynamic signaling received from the parent node may be able to adapt only DU Soft resources. Depending on the scenario, in some embodiments, DU status may be determined, at least partially, also based on higher layer configuration and/or dynamic signalling related to MT part. For example, if MT is configured to receive SSB, DU may be considered to operate according to NA regardless of the DU configuration.

According to certain embodiments, MT Tx may be determined based on a valid UL scheduling grant. Another option to determine MT Tx, for example relevant for semi-persistent or periodic UL transmission, can be based on other information such as MT resource configuration (U/D/F) and/or dynamic SFI indicated using DCI format 2_0. Dynamic SFI indicated using DCI format 2_0 may be able to adapt only Flexible MT resources. In one embodiment, DU NA/IA/INA may be determined based one or more of the following: higher layer configuration equals NA, dynamic indication using DCI format 2_5, and/or implicit determination. In some example embodiments, the implicit determination may relate to TDM configuration only, and the IAB node may use a soft (i.e. conditionally available) DU resource for transmission and/or reception in line with D/U/F configuration of the resource, if and only if the use of the resource does not change the IAB-MT behavior relative to the IAB-MT behavior if the resource was instead configured as unavailable type. If IA is determined based on these rules, MT may operate according to Offset 2, and if INA is determined, MT may operate according to Offset 1, respectively.

In another embodiment, when multiple panels are present or available, the transmitting 420 may include providing an explicit indication in DL/UL grant to indicate whether the first offset (offset 1) or the second offset (offset 2) should be applied. For example, according to an embodiment, where [MT Tx, DU NA] or [MT Tx, DU INA] indicates timing according to TDM, then the first offset may be applied (offset 1) and, where [MT Tx, DU IA] indicates timing according to FDM/SDM, then an explicit indication in DL/UL grant may indicate whether the first offset (offset 1) or the second offset (offset 2) should be applied. In other words, explicit indication (such as one bit and/or one or two signaling states in UL/DL grant) may be used to override the implicit rule (based on resource configuration only). In this embodiment, the first offset (offset 1) may support (also) simultaneous MT Tx and DU Tx via different panels (i.e., FDM/SDM based IAB implementation), and the second offset (offset 2) may support (only) simultaneous MT Tx and DU Tx via the same panel. It may be up-to IAB node implementation to determine the conditions where FDM/SDM can be applied, when offset 2 is used in the MT link. IAB node capability signaling defined for FDM/SDM scenario may be enhanced to indicate the capabilities of IAB node for simultaneous transmission and/or reception. For example, the capability signaling may indicate the number of panels available for simultaneous transmission and/or reception. It may also indicate the capability (or no capability) for simultaneous transmission via multiple/different panels with different Tx timings.

Figure 4B:
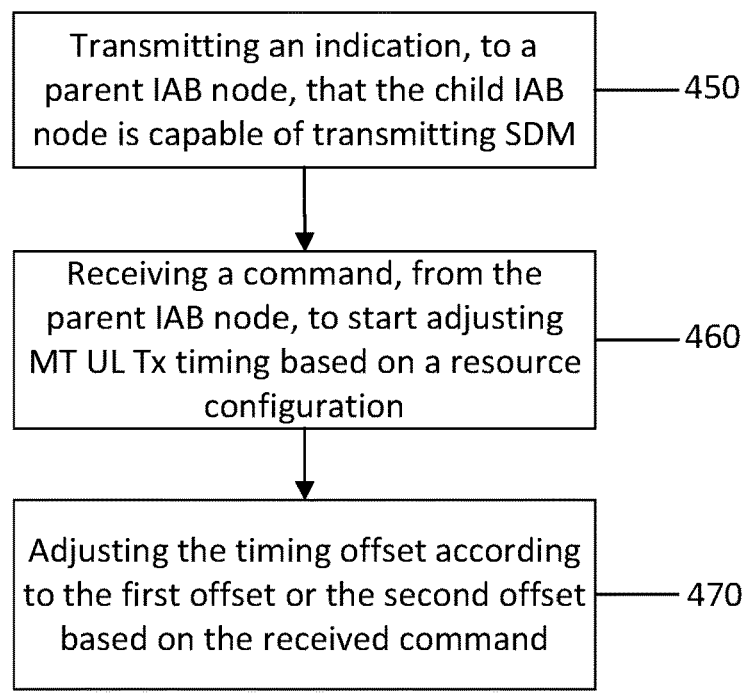
FIG. 4b illustrates an example flow diagram of a method, according to an embodiment.

FIG. 4b illustrates an example flow diagram of a method for performing synchronization and timing for an IAB node, according to one example embodiment. In an example embodiment, the flow diagram of FIG. 4b may be performed by a network entity or network node associated with a communication system, such as LTE or 5G NR. For instance, in some example embodiments, the network node performing the method of FIG. 4b may include a base station, eNB, gNB, NG-RAN node, and/or IAB node. In one example embodiment, the method of FIG. 4b may be performed by a child IAB node, such as those illustrated in FIG. 1 or 2.

As illustrated in the example of FIG. 4b, the method may include, at 450, transmitting an indication, to a parent IAB node, that the child IAB node is capable of transmitting SDM. In one example embodiment, the child IAB node may initially be operating according to TDM mode and MT may be operating according to legacy TA commands.

As further illustrated in the example of FIG. 4b, the method may include, at 460, receiving a command, from the parent IAB node, to start adjusting MT UL Tx timing based on a resource configuration. When the resource configuration indicates that SDM and/or FDM mode with timing alignment is used, MT timing follows a second offset (offset 2). When the resource configuration indicates not to use SDM and/or FDM mode with timing alignment, MT timing follows a first offset. In an embodiment, the first offset (offset 1) can be based on legacy TA control and the second offset (offset 2) may align MT Tx with DU Tx. According to one embodiment, the time difference between the first offset (offset 1) and the second offset (offset 2) may depend on the propagation delay (TP) on the link between the child IAB node and parent IAB node, and can start from 0 spanning one of more symbol durations. Thus, in certain embodiments, the length of the timing difference may depend on the propagation delay.

In one embodiment, the receiving 460 may include receiving the command to start adjusting the MT UL Tx timing implicitly based on the resource configuration. For example, according to an embodiment, where [MT Tx, DU NA] or [MT Tx, INA] indicates timing according to TDM, then the first offset may be applied (offset 1) and, where [MT Tx, DU IA] indicates timing according to FDM/SDM, then the second offset (offset 2) may be applied. According to an embodiment, the method may also include, at 470, adjusting the timing offset according to the first offset (offset 1) or the second offset (offset 2) based on a resource configuration.

According to certain embodiments, MT Tx may be determined based on a valid UL scheduling grant. Another option to determine MT Tx, for example relevant for semi-persistent or periodic UL transmission, can be based on other information such as MT resource configuration (U/D/F) and/or dynamic SFI indicated using DCI format 2_0. In one embodiment, DU NA/IA/INA may be determined based one or more of the following: higher layer configuration equals NA, dynamic indication using DCI format 2_5, and/or implicit determination. In some example embodiments, the implicit determination may relate to TDM configuration only, and the IAB node may use a soft (i.e., conditionally available) DU resource for transmission and/or reception in line with D/U/F configuration of the resource, if and only if the use of the resource does not change the IAB-MT behavior relative to the IAB-MT behavior if the resource was instead configured as unavailable type. If IA is determined based on these rules, MT may operate according to the second offset (offset 2), and if INA is determined, MT may operate according to the first offset (offset 1), respectively.

In another embodiment, when multiple panels are present or available, the receiving 460 may include receiving an explicit indication in DL/UL grant to indicate whether the first offset (offset 1) or the second offset (offset 2) should be applied. For example, according to an embodiment, where [MT Tx, DU NA] or [MT Tx, INA] indicates timing according to TDM, then the first offset may be applied (offset 1) and, where [MT Tx, DU IA] indicates timing according to FDM/SDM, then an explicit indication in DL/UL grant may indicate whether the first offset (offset 1) or the second offset (offset 2) should be applied. In other words, explicit indication (such as one bit and/or one or two signaling states in UL/DL grant) may be used to override the implicit rule (based on resource configuration only). In this embodiment, the first offset (offset 1) may (also) support simultaneous MT Tx and DU Tx via different panels (i.e., FDM/SDM based IAB implementation), and the second offset (offset 2) may support (only) simultaneous MT Tx and DU Tx via the same panel.

Figure 5A:
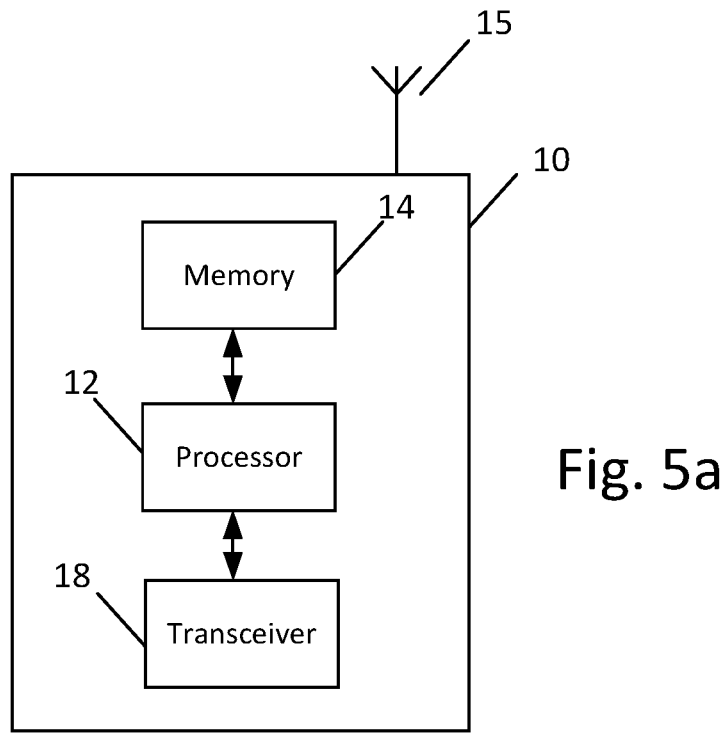
FIG. 5a illustrates an example block diagram of an apparatus, according to an embodiment.

FIG. 5a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), IAB node, and/or WLAN access point, associated with a radio access network, such as a LTE network, 5G or NR. In example embodiments, apparatus 10 may be or may include a NG-RAN node, an eNB in LTE, gNB in 5G, or the like. For instance, in one embodiment, apparatus 10 may correspond to the parent IAB node illustrated in FIG. 1 or 2.

It should be understood that, in some example embodiments, apparatus 10 may be comprised of an edge cloud server as a distributed computing system where the server and the radio node may be stand-alone apparatuses communicating with each other via a radio path or via a wired connection, or where they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 5a.

As illustrated in the example of FIG. 5a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5a, multiple processors may be utilized according to other example embodiments. For example, it should be understood that, in certain embodiments, apparatus 10 may include two or more processors that may form a multiprocessor system (e.g., in this case processor 12 may represent a multiprocessor) that may support multiprocessing. In some embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. In certain embodiments, the radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and/or the like. According to an example embodiment, the radio interface may include components, such as filters, converters (for example, digital-to-analog converters and the like), mappers, a Fast Fourier Transform (FFT) module, and/or the like, e.g., to generate symbols for transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally, or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, IAB node, WLAN access point, or the like. For example, in some embodiments, apparatus 10 may be configured to perform one or more of the processes depicted in any of the flow charts or signaling diagrams described herein, such as those illustrated in FIG. 1-3, 4a or 4b. In some embodiments, as discussed herein, apparatus 10 may be configured to perform a procedure relating to synchronization and/or timing control for IAB node(s).

According to this embodiment, apparatus 10 may be controlled by memory 14 and processor 12 to receive an indication that a child IAB node is capable of transmitting SDM. In one example embodiment, the child IAB node may initially be operating according to TDM mode and MT may be operating according to legacy TA commands. In an embodiment, apparatus 10 may be controlled by memory 14 and processor 12 to allocate resources and/or determine a resource configuration, and to set a TA mode for a first offset (offset 1) to be used with TDM and a second offset (offset 2) to be used with SDM and/or FDM. In an embodiment, the first offset (offset 1) can be based on legacy TA control and the second offset (offset 2) may align MT Tx with DU Tx. According to one embodiment, the time difference between the first offset (offset 1) and the second offset (offset 2) may depend on the propagation delay (TP) on the link between the child IAB node and parent IAB node, and can start from 0 spanning one of more symbol durations. According to an embodiment, when multiple IAB nodes are involved, scheduling of MT UL Tx with different UL reference timing may be time division duplexed with respect to each other.

According to certain embodiments, apparatus 10 may be controlled by memory 14 and processor 12 to transmit a command, to the child IAB node, to start adjusting MT UL Tx timing based on the resource configuration. When the resource configuration indicates that SDM and/or FDM mode with timing alignment is used, MT timing follows the second offset (offset 2). However, when the resource configuration indicates not to use SDM and/or FDM mode with timing alignment, MT timing follows the first offset (offset 1).

In one embodiment, apparatus 10 may be controlled by memory 14 and processor 12 to provide the command to start adjusting the MT UL Tx timing implicitly based on the resource configuration. For example, according to an embodiment, where [MT Tx, DU NA] or [MT Tx, DU INA] indicates timing according to TDM, then the first offset may be applied (offset 1) and, where [MT Tx, DU IA] indicates timing according to FDM/SDM, then the second offset (offset 2) may be applied. In an embodiment, apparatus 10 may be controlled by memory 14 and processor 12 to determine the DU status (NA, INA, IA), e.g., based on higher layer configuration (such as DU resource configuration) and/or based on dynamic signaling received from parent node (such as DCI format 2_5). Depending on the scenario, in some embodiments, DU status may be determined, at least partially, also based on higher layer configuration and/or dynamic signalling related to MT part. For example, if MT is configured to receive SSB, DU may be considered to operate according to NA regardless of the DU configuration.

According to certain embodiments, MT Tx may be determined based on a valid UL scheduling grant. Another option to determine MT Tx, for example relevant for semi-persistent or periodic UL transmission, can be based on other information such as MT resource configuration (U/D/F) and/or dynamic SFI indicated using DCI format 2_0. In one embodiment, DU NA/IA/INA may be determined based one or more of the following: higher layer configuration equals NA, dynamic indication using DCI format 2_5, and/or implicit determination. As discussed above, the implicit determination may relate to TDM configuration only, and the IAB node may use a soft (i.e. conditionally available) DU resource for transmission and/or reception in line with D/U/F configuration of the resource, if and only if the use of the resource does not change the IAB-MT behavior relative to the IAB-MT behavior if the resource was instead configured as unavailable type.

In another embodiment, when multiple panels are present or available, apparatus 10 may be controlled by memory 14 and processor 12 to provide an explicit indication in DL/UL grant to indicate whether the first offset (offset 1) or the second offset (offset 2) should be applied. For example, according to an embodiment, where [MT Tx, DU NA] or [MT Tx, DU INA] indicates timing according to TDM, then the first offset may be applied (offset 1) and, where [MT Tx, DU IA] indicates timing according to FDM/SDM, then an explicit indication in DL/UL grant may indicate whether the first offset (offset 1) or the second offset (offset 2) should be applied. In other words, explicit indication (such as one bit and/or one or two signaling states in UL/DL grant) may be used to override the implicit rule (based on resource configuration only). In this embodiment, the first offset (offset 1) may support simultaneous MT Tx and DU Tx via different panels (i.e., FDM/SDM based IAB implementation), and the second offset (offset 2) may support simultaneous MT Tx and DU Tx via the same panel.

Figure 5B:
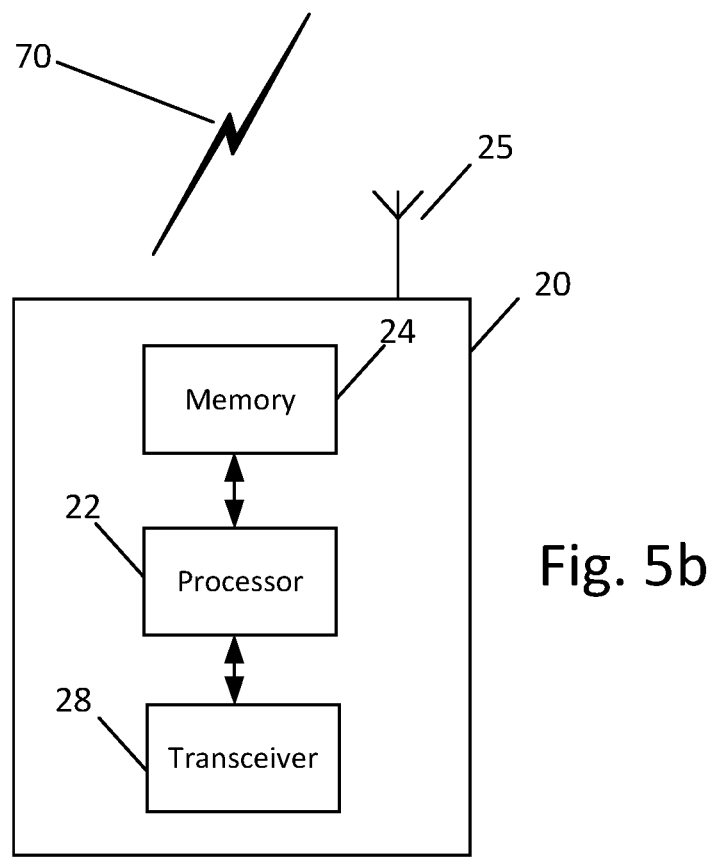
FIG. 5b illustrates an example block diagram of an apparatus, according to an embodiment.

FIG. 5b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. In some embodiments, apparatus 20 may be a satellite, base station, a Node B, an evolved Node B (eNB), 5G Node B or access point, next generation Node B (NG-NB or gNB), IAB node, and/or WLAN access point, associated with a radio access network, such as a LTE network, 5G or NR. In example embodiments, apparatus 10 may be or may include a NG-RAN node, an eNB in LTE, gNB in 5G, or the like. For instance, in one embodiment, apparatus 20 may correspond to the child IAB node illustrated in FIG. 1 or 2.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5b.

As illustrated in the example of FIG. 5b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5b, multiple processors may be utilized according to other example embodiments. For example, it should be understood that, in certain embodiments, apparatus 20 may include two or more processors that may form a multiprocessor system (e.g., in this case processor 22 may represent a multiprocessor) that may support multiprocessing. In some embodiments, the multiprocessor system may be tightly coupled or loosely coupled (e.g., to form a computer cluster).

Processor 22 may perform functions associated with the operation of apparatus 20 including, as some non-limiting examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and/or for transmitting via an uplink from apparatus 20. According to certain embodiments, apparatus 20 may further include a transceiver 28 configured to transmit and receive information. In one example, the transceiver 28 may also include a radio interface (e.g., a modem) coupled to the antenna 25. In some embodiments, the radio interface may correspond to a plurality of radio access technologies including one or more of GSM, LTE, LTE-A, 5G, NR, WLAN, NB-IoT, Bluetooth, BT-LE, NFC, RFID, UWB, and the like. In further example embodiments, the radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally, or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and/or memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 1-3, 4a or 4b. In certain embodiments, apparatus 20 may include or represent an IAB node and may be configured to perform a procedure relating to synchronization and timing control for IAB node(s), for instance.

In certain embodiments, apparatus 20 may be controlled by memory 24 and processor 22 to transmit an indication, to a parent IAB node, that the apparatus 20 is capable of transmitting SDM. According to an embodiment, apparatus 20 may be controlled by memory 24 and processor 22 to receive a command, from the parent IAB node, to start adjusting MT UL Tx timing based on a resource configuration. When the resource configuration indicates that SDM and/or FDM mode with timing alignment is used, MT timing follows a second offset (offset 2). When the resource configuration indicates not to use SDM and/or FDM mode with timing alignment, MT timing follows a first offset. In an embodiment, the first offset (offset 1) can be based on legacy TA control and the second offset (offset 2) may align MT Tx with DU Tx. According to one embodiment, the time difference between the first offset (offset 1) and the second offset (offset 2) may depend on the propagation delay (TP) on the link between the child IAB node and parent IAB node, and can start from 0 spanning one of more symbol durations.

In one embodiment, apparatus 20 may be controlled by memory 24 and processor 22 to receive the command to start adjusting the MT UL Tx timing implicitly based on the resource configuration. For example, according to an embodiment, where [MT Tx, DU NA] or [MT Tx, INA] indicates timing according to TDM, then the first offset may be applied (offset 1) and, where [MT Tx, DU IA] indicates timing according to FDM/SDM, then the second offset (offset 2) may be applied. According to an embodiment, apparatus 20 may be controlled by memory 24 and processor 22 to, based on the received command, adjust the timing offset according to the first offset (offset 1) or the second offset (offset 2).

According to certain embodiments, MT Tx may be determined based on a valid UL scheduling grant. Another option to determine MT Tx, for example relevant for semi-persistent or periodic UL transmission, can be based on other information such as MT resource configuration (U/D/F) and/or dynamic SFI indicated using DCI format 2_0. In one embodiment, DU NA/IA/INA may be determined based one or more of the following: higher layer configuration equals NA, dynamic indication using DCI format 2_5, and/or implicit determination. In some example embodiments, the implicit determination may relate to TDM configuration only, and the IAB node may use a soft (i.e. conditionally available) DU resource for transmission and/or reception in line with D/U/F configuration of the resource, if and only if the use of the resource does not change the IAB-MT behavior relative to the IAB-MT behavior if the resource was instead configured as unavailable type.

In another embodiment, when multiple panels are present or available, apparatus 20 may be controlled by memory 24 and processor 22 to receive an explicit indication in DL/UL grant to indicate whether the first offset (offset 1) or the second offset (offset 2) should be applied. For example, according to an embodiment, where [MT Tx, DU NA] or [MT Tx, INA] indicates timing according to TDM, then the first offset may be applied (offset 1) and, where [MT Tx, DU IA] indicates timing according to FDM/SDM, then an explicit indication in DL/UL grant may indicate whether the first offset (offset 1) or the second offset (offset 2) should be applied. In other words, explicit indication (such as one bit and/or one or two signaling states in UL/DL grant) may be used to override the implicit rule (based on resource configuration only). In this embodiment, the first offset (offset 1) may (also) support simultaneous MT Tx and DU Tx via different panels (i.e., FDM/SDM based IAB implementation), and the second offset (offset 2) may support (only) simultaneous MT Tx and DU Tx via the same panel.

Further embodiments may provide means for performing any of the functions, steps or procedures described herein. For example, one embodiment may be directed to an apparatus that includes means for receiving an indication that a child IAB node is capable of transmitting SDM. The apparatus may also include means for allocating resources and/or determining a resource configuration and means for setting a TA mode for a first offset to be used with TDM and a second offset to be used with SDM and/or FDM. The apparatus may then include means for transmitting a command, to the child IAB node, to start adjusting MT UL Tx timing based on the resource configuration. In a variant, when the resource configuration indicates that SDM and/or FDM mode with timing alignment is used, MT timing follows the second offset and, when the resource configuration indicates not to use SDM and/or FDM mode with timing alignment, MT timing follows the first offset.

Another embodiment may be directed to an apparatus that includes means for transmitting an indication, to a parent IAB node, that the child IAB node is capable of transmitting SDM. The apparatus may also include means for receiving a command, from the parent IAB node, to start adjusting MT UL Tx timing based on a resource configuration. According to certain variants, when the resource configuration indicates that SDM and/or FDM mode with timing alignment is used, MT timing follows a second offset and, when the resource configuration indicates not to use SDM and/or FDM mode with timing alignment, MT timing follows a first offset. The apparatus may also include means for adjusting the timing offset according to the first offset or the second offset based on the received command.

Therefore, certain example embodiments provide several technological improvements, enhancements, and/or advantages over existing technological processes and constitute an improvement at least to the technological field of wireless network control and management. For example, certain embodiments may address the synchronization and timing for IAB node(s). Example embodiments can minimize or reduce guard period (GP) overhead (i.e., overhead does not need to be determined according to the worst-case scenario). Furthermore, certain embodiments can solve the uncertainty related to a parent DU Rx timing (i.e., which timing to use). Also, additional signaling can be minimized or reduced (the MT Tx timing is determined based on existing signaling defined for IAB node resource allocation). Additionally, a parent DU can receive from both access UEs and MT using a single Rx timing (i.e. no need for parallel FFTs, one for access UEs, another for BH link). Moreover, example embodiments scale to different implementation options, such as one or multiple panels, and allows for the usage of TDM based timing in the multi-panel scenario. Accordingly, the use of certain example embodiments results in improved functioning of communications networks and their nodes, such as base stations, eNBs, gNBs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations for implementing the functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus, for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

A first embodiment may be directed to a method that may be performed by a parent IAB node. The method may include receiving an indication that a child IAB node is capable of transmitting SDM. The method may also include allocating resources and/or determining a resource configuration and using the determined resource configuration to set a TA mode for a first offset to be used with TDM and a second offset to be used with SDM and/or FDM. The method may then include transmitting a command, to the child IAB node, to start adjusting MT UL Tx timing based on the determined resource configuration and/or the timing advance (TA).

In a variant, when the resource configuration indicates that SDM and/or FDM mode with timing alignment is used, MT timing follows the second offset and, when the resource configuration indicates not to use SDM and/or FDM mode with timing alignment, MT timing follows the first offset. In other words, when the resource configuration indicates that SDM or FDM mode is used, then it is determined to apply the second offset to determine the MT timing and, when the resource configuration indicates not to use SDM or FDM, then it is determined to apply the first offset.

In a variant, the method may include receiving an uplink signal, from the child IAB node, according to the first offset or the second offset that the MT timing follows.

In a variant, the first offset can be based on legacy TA control and the second offset may align MT Tx with DU Tx.

According to a variant, the time difference between the first offset and the second offset may depend on the propagation delay (TP) on the link between the child IAB node and parent IAB node and can start from 0 spanning one of more symbol durations.

According to a variant, when multiple IAB nodes are involved, scheduling of MT UL Tx with different UL reference timing may be time division duplexed with respect to each other.

In a variant, the transmitting of the command may include providing the command to start adjusting the MT UL Tx timing implicitly based on the resource configuration. For example, according to a variant, where MT Tx+DU NA or INA indicates timing according to TDM, then the first offset may be applied and, where MT Tx+DU IA indicates timing according to FDM/SDM, then the second offset may be applied.

According to a variant, MT Tx may be determined based on a valid UL scheduling grant and, optionally, other information such as MT resource configuration (e.g., U/D/F) and dynamic SFI indicated using DCI format 2_0. In one variant, DU NA/IA/INA may be determined based one or more of the following: higher layer configuration equals NA, dynamic indication using DCI format 2_5, and/or implicit determination.

In another variant, when multiple panels are present or available, the transmitting of the command may include providing an explicit indication in DL/UL grant to indicate whether the first offset or the second offset should be applied. For example, according to a variant, where MT Tx+DU NA or INA indicates timing according to TDM, then the first offset may be applied and, where MT Tx+DU IA indicates timing according to FDM/SDM, then an explicit indication in DL/UL grant may indicate whether the first offset or the second offset should be applied. In this variant, the first offset may support simultaneous MT Tx and DU Tx via different panels, and the second offset may support simultaneous MT Tx and DU Tx via the same panel.

A second embodiment is directed to a method that may be performed by a child IAB node. The method may include transmitting an indication, to a parent IAB node, that the child IAB node is capable of transmitting SDM. The method may also include receiving a command, from the parent IAB node, to start adjusting MT UL Tx timing based on a resource configuration. According to certain variants, when the resource configuration indicates that SDM and/or FDM mode with timing alignment is used, MT timing follows a second offset and, when the resource configuration indicates not to use SDM and/or FDM mode with timing alignment, MT timing follows a first offset.

According to a variant, the method may also include adjusting the timing offset according to the first offset or the second offset based on the received command.

In one example variant, the child IAB node may initially be operating according to TDM mode and MT may be operating according to legacy TA commands.

In a variant, the first offset can be based on legacy TA control and the second offset may align MT Tx with DU Tx. According to some variants, the time difference between the first offset and the second offset may depend on the propagation delay (TP) on the link between the child IAB node and parent IAB node and can start from 0 spanning one of more symbol durations.

In a variant, the receiving of the command may include receiving the command to start adjusting the MT UL Tx timing implicitly based on the resource configuration. For example, according to a variant, where MT Tx+DU NA or INA indicates timing according to TDM, then the first offset may be applied and, where MT Tx+DU IA indicates timing according to FDM/SDM, then the second offset may be applied.

In a variant, the method may also include transmitting an uplink signal according to one of the first offset or the second offset that the MT timing follows.

According to certain variants, MT Tx may be determined based on a valid UL scheduling grant and, optionally, other information such as MT resource configuration (e.g., U/D/F) and dynamic SFI indicated using DCI format 2_0. In one variant, DU NA/IA/INA may be determined based one or more of the following: higher layer configuration equals NA, dynamic indication using DCI format 2_5, and/or implicit determination.

In another variant, when multiple panels are present or available, the receiving of the command may include receiving an explicit indication in DL/UL grant to indicate whether the first offset or the second offset should be applied. For example, according to a variant, where MT Tx+DU NA or INA indicates timing according to TDM, then the first offset may be applied and, where MT Tx+DU IA indicates timing according to FDM/SDM, then an explicit indication in DL/UL grant may indicate whether the first offset or the second offset should be applied. In this variant, the first offset may support simultaneous MT Tx and DU Tx via different panels, and the second offset may support simultaneous MT Tx and DU Tx via the same panel.

A third embodiment is directed to an apparatus including at least one processor and at least one memory comprising computer program code. The at least one memory and computer program code may be configured, with the at least one processor, to cause the apparatus at least to perform the method according to the first embodiment, the second embodiment, and/or any other embodiments discussed herein, or any of the variants described above.

A fourth embodiment is directed to an apparatus that may include circuitry configured to perform the method according to the first embodiment, the second embodiment, and/or any other embodiments discussed herein, or any of the variants described above.

A fifth embodiment is directed to an apparatus that may include means for performing the method according to the first embodiment, the second embodiment, and/or any other embodiments discussed herein, or any of the variants described above.

A sixth embodiment is directed to a non-transitory computer readable medium comprising program instructions stored thereon for performing at least the method according to the first embodiment, the second embodiment, and/or any other embodiments discussed herein, or any of the variants described above.

PARTIAL GLOSSARY

BH back haul
CE control element
DL downlink
DU distributed unit
FDM frequency division multiplexing GP guard period
IA indication available
IAB Integrated access and backhaul
INA indication not available
MAC media access control
MT mobile termination
OTA over the air
RTT round trip time
RX reception
SDM spatial division multiplexing
TA timing advance
T_delta timing parameter related to RX/TX switching gap at the parent node
TDM time division multiplexing
TP propagation delay
TX transmission
UL uplink.

We claim:

1. An apparatus, comprising:
   at least one processor; and
   at least one memory comprising computer program code,
   the at least one memory and computer program code are configured, with the at least one processor, to cause the apparatus at least to
   receive an indication that an integrated access and backhaul (IAB) node is capable of transmitting spatial division multiplexing (SDM);
   determine a resource configuration and using the determined resource configuration to set a timing advance (TA) mode with two offsets comprising a first offset to be used with time division multiplexing (TDM) and a second offset to be used with at least one of spatial division multiplexing (SDM) or frequency division multiplexing (FDM); and
   transmit a command, to the integrated access and backhaul (IAB) node, to start adjusting mobile termination (MT) uplink (UL) transmission (Tx) timing based on the determined resource configuration and the timing advance (TA).

2. The apparatus according to claim 1, wherein, when the resource configuration indicates that at least one of SDM or FDM mode with timing alignment is used, MT timing follows the second offset and, when the resource configuration indicates not to use at least one of SDM or FDM mode with timing alignment, MT timing follows the first offset.

3. The apparatus according to claim 1, further comprising receiving an uplink signal, from the TAB node, according to one of the first offset or the second offset that the MT timing follows, wherein the first offset is based on legacy TA control and the second offset aligns MT Tx with distributed unit (DU) Tx.

4. The apparatus according to claim 1, wherein a time difference between the first offset and the second offset depends on a propagation delay (TP) on a link between a parent node and the IAB node, wherein said apparatus comprises the parent node.

5. The apparatus according to claim 1, wherein, when multiple IAB nodes are present, scheduling of MT UL Tx with different UL reference timing is time division duplexed with respect to each other.

6. The apparatus according to claim 1, wherein the transmitting of the command comprises providing the command to start adjusting the MT UL Tx timing at least partially based on the resource configuration.

7. The apparatus according to claim 1, wherein, when multiple panels are present or available, the transmitting of the command comprises providing an explicit indication in downlink (DL) or uplink (UL) grant to indicate whether the first offset or the second offset should be applied.

8. The apparatus according to claim 1, wherein the first offset supports simultaneous MT Tx and DU Tx via different panels, and the second offset supports simultaneous MT Tx and DU Tx via the same panel.

9. The apparatus according to claim 1, wherein the MT UL Tx is determined based on a valid UL scheduling grant.

10. The apparatus according to claim 1, wherein the MT UL Tx is determined based on information including at least one of MT resource configuration or dynamic slot format indication (SFI) indicated using downlink control information (DCI) format 2_0.

11. An apparatus, comprising:
    at least one processor; and
    at least one memory comprising computer program code,
    the at least one memory and computer program code are configured, with the at least one processor, to cause the apparatus at least to
    transmit an indication to a parent node, that the apparatus is capable of transmitting spatial division multiplexing (SDM);
    receive a command, from the parent node, to start adjusting mobile termination (MT) uplink (UL) transmission (Tx) timing based on a resource configuration,
    wherein, when the resource configuration indicates that at least one of spatial division multiplexing (SDM) or frequency division multiplexing (FDM) mode with timing alignment is used, MT timing follows a second offset and, when the resource configuration indicates not to use at least one of SDM or FDM mode with timing alignment, MT timing follows a first offset.

12. The apparatus according to claim 11, wherein the apparatus is initially operating according to time division multiplexing (TDM) mode and MT is operating according to legacy timing advance (TA) commands.

13. The apparatus according to claim 11, wherein the first offset is based on legacy timing advance (TA) control and the second offset aligns MT UL Tx with distributed unit (DU) Tx.

14. The apparatus according to claim 11, wherein a time difference between the first offset and the second offset depends on the propagation delay (TP) on a link between a IAB node and the parent node, wherein said apparatus comprises the IAB node.

15. The apparatus according to claim 11, wherein the receiving of the command comprises receiving the command to start adjusting the MT UL Tx timing at least partially based on the resource configuration.

16. The apparatus according to claim 11, wherein, when multiple panels are present, the receiving of the command comprises receiving an explicit indication in downlink (DL) or uplink (UL) grant to indicate whether the first offset or the second offset should be applied.

17. The apparatus according to claim 11, wherein the first offset supports simultaneous MT Tx and DU Tx via different panels, and the second offset supports simultaneous MT Tx and DU Tx via the same panel.

18. The apparatus according to claim 11, wherein the MT UL Tx is determined based on a valid UL scheduling grant.

19. The apparatus according to claim 11, wherein the MT UL Tx is determined based on information including at least one of MT resource configuration or dynamic slot format indication (SFI) indicated using downlink control information (DCI) format 2_0.

20. A method, comprising:
receiving, at a parent node, an indication that an integrated access and backhaul (IAB) node is capable of transmitting spatial division multiplexing (SDM);
determining, at the parent node, a resource configuration and using the determined resource configuration to set a timing advance (TA) mode with two offsets comprising a first offset to be used with time division multiplexing (TDM) and a second offset to be used with at least one of spatial division multiplexing (SDM) or frequency division multiplexing (FDM); and
transmitting a command, to the integrated access and backhaul (IAB) node, to start adjusting mobile termination (MT) uplink (UL) transmission (Tx) timing based on the determined resource configuration and the timing advance (TA).

\* \* \* \* \*